United States Patent
Yoshida et al.

(10) Patent No.: US 10,680,230 B2
(45) Date of Patent: Jun. 9, 2020

(54) SQUARE SECONDARY BATTERY

(71) Applicants: SANYO Electric Co., Ltd., Daito-shi, Osaka (JP); TOYOTA JIDOSHA KABUSHIKI KAISHA, Toyota-shi, Aichi-ken (JP)

(72) Inventors: Shinichirou Yoshida, Hyogo (JP); Hiroyuki Inoue, Hyogo (JP); Eiji Okutani, Hyogo (JP); Takashi Tokunaga, Aichi (JP); Toshihiro Takada, Aichi (JP); Takenori Tsuchiya, Aichi (JP)

(73) Assignees: SANYO Electric Co., Ltd., Daito-shi (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 267 days.

(21) Appl. No.: 15/926,188

(22) Filed: Mar. 20, 2018

(65) Prior Publication Data
US 2018/0277823 A1    Sep. 27, 2018

(30) Foreign Application Priority Data
Mar. 22, 2017    (JP) ................................ 2017-056348

(51) Int. Cl.
| H01M 2/34 | (2006.01) |
| H01M 2/08 | (2006.01) |
| H01M 2/26 | (2006.01) |
| H01M 2/06 | (2006.01) |
| H01M 2/02 | (2006.01) |

(Continued)

(52) U.S. Cl.
CPC ......... *H01M 2/345* (2013.01); *H01M 2/0277* (2013.01); *H01M 2/06* (2013.01); *H01M 2/08* (2013.01); *H01M 2/263* (2013.01); *H01M 2/30* (2013.01); *H01M 2/0217* (2013.01);
(Continued)

(58) Field of Classification Search
None
See application file for complete search history.

(56) References Cited

U.S. PATENT DOCUMENTS

| 10,153,478 B2 * | 12/2018 | Yoshida ............. H01M 2/0237 |
| 2013/0196185 A1 | 8/2013 | Yokoyama et al. |
| 2015/0303443 A1 | 10/2015 | Yokoyama et al. |

FOREIGN PATENT DOCUMENTS

JP    2013-157099 A    8/2013

* cited by examiner

*Primary Examiner* — Lucas J. O'Donnell
(74) *Attorney, Agent, or Firm* — Westerman, Hattori, Daniels & Adrian, LLP

(57) ABSTRACT

A battery includes: an electrode body; an electrode current collector; a sealing body; an external terminal; an electrical conductor connected to the external terminal; a deforming plate sealing an opening of the electrical conductor, electrically connected to the electrical conductor and to the current collector, and deformed when an internal pressure reaches a predetermined pressure; and a first insulator between the deforming plate and the current collector. The current collector includes a base, and a lead connecting to the electrode body. First to fourth fasteners fasten the base and the first insulator. Between the first and second fasteners, the base is electrically connected to the deforming plate. The second fastener is closer to the lead than the first fastener. The second fastener is closer to a connection between the deforming plate and the electrode current collector than a position of the first insulator supported toward the sealing body.

10 Claims, 9 Drawing Sheets

(51) Int. Cl.
*H01M 2/30* (2006.01)
*H01M 2/04* (2006.01)
*H01M 10/04* (2006.01)

(52) U.S. Cl.
CPC ...... *H01M 2/0426* (2013.01); *H01M 10/0431* (2013.01); *H01M 2220/20* (2013.01)

SQUARE SECONDARY BATTERY

CROSS-REFERENCE TO RELATED APPLICATION

This application claims priority to Japanese Patent Application No. 2017-056348 filed on Mar. 22, 2017, the entire disclosure of which is incorporated by reference herein.

BACKGROUND

The present disclosure relates to a square secondary battery.

Alkaline secondary batteries and nonaqueous electrolyte secondary batteries are used for such purposes as driving power sources for electric vehicles (EV), hybrid electric vehicles (HEV), and plug-in hybrid electric vehicles (PHEV), and stationary rechargeable battery systems in reducing output fluctuation in, for example, solar power generation and wind power generation and in peak-shifting grid power to store electricity at night and use the stored electricity in the day time.

As disclosed in, for example, Japanese Unexamined Patent Publication No. 2013-157099, a battery to be used for such purposes is provided not only with a gas exhaust valve to release internal pressure of the battery casing when the pressure increases but also with a current interrupt mechanism to interrupt electrical connection between an external terminal and an electrode body inside the battery casing.

In a technique disclosed in Japanese Unexamined Patent Publication No. 2013-157099, a positive electrode current collector or a negative electrode current collector included in the current interrupt mechanism, a first opening, a second opening, at least one third opening or a cut-out, and projections formed on the second insulating member engage with each other. The first to third openings and the cut-out are formed either on the positive electrode current collector or the negative electrode current collector in the second insulating member.

In Japanese Unexamined Patent Publication No. 2013-157099, a high voltage is still applied to a battery module even after the battery is overcharged such that the current interrupt mechanism is activated to interrupt a current. Hence, if electrolyte adheres to a surface of the insulating member made of resin, the surface could conduct the current. When the current runs through the surface of the insulating member, the surface could carbonize. The carbonized portion could be a cause of reconduction, followed by production of sparks.

In order to reduce such risks as reconduction and sparks, the insulating member can be made of such fluorine resin as perfluoroalkoxy alkanes (PFA) which is hard to be carbonized even though the current runs through the surface of the insulating member. Fluorine resin is relatively soft.

Moreover, in the Japanese Unexamined Patent Publication No. 2013-157099, the second insulating member is latched on, and engages with, a lower first insulating member. This second insulating member can be made of a soft resin material such as the fluorine resin described above. Use of the second insulating member made of the soft resin material can reduce the risk of damage to the second insulating member when the second insulating member and the lower first insulating member are connected to each other. However, the soft second insulating member causes new problems below.

The positive electrode current collector or the negative electrode current collector is connected to a reverse plate. Moreover, the positive electrode current collector is connected to a positive plate and the negative electrode current collector is connected to a negative plate. Then, a fastener is provided to fasten the positive electrode current collector or the positive electrode current collector and the second insulating member together. Thus, the second insulating member receives, through the positive electrode current collector or the negative electrode current collector, the weight of the electrode body including a positive plate and a negative plate.

The second insulating member is connected to the lower first insulating member and supported toward a sealing body. The fastener fastening the positive electrode current collector or the negative electrode current collector and the second insulator together is located closer to the connection between the positive electrode current collector or the negative electrode current collector and the reverse plate than to the connection between the second insulating member and the lower first insulating member. Hence, if the second insulating member is made of a soft material, the second insulating member could be deformed by the weight of the electrode body. The deformed second insulating member changes a state of the connection between the positive electrode current collector or the negative electrode current collector and the reverse plate, causing a possible malfunction of the current interrupt mechanism.

Note that such problems are not limited to the case of using the second insulating member made of a soft resin material. The problems can be caused when the second insulating member is thin or the electrode body weighs significantly.

The present disclosure is conceived in view of the above problems, and intends to offer a square secondary battery including a current interrupt mechanism a working pressure of which is more stable, so that the square secondary battery is reliable.

SUMMARY

The present disclosure is directed to a square secondary battery including: a battery case having an opening; an electrode body housed in the battery case and including a positive electrode and a negative electrode; a positive electrode current collector electrically connected to the positive electrode; a negative electrode current collector electrically connected to the negative electrode; a sealing body sealing the opening of the battery case; an external terminal exposed outside from the sealing body; an electrical conductor located between the sealing body and the electrode body, electrically connected to the external terminal, and having a tube; a deforming plate sealing an opening of the tube, electrically connected to the electrical conductor and to either the positive electrode current collector or the negative electrode current collector, and deformed when an internal pressure of the battery case reaches a predetermined pressure so that the deforming plate is electrically disconnected from either the positive electrode current collector or the negative electrode current collector; and a first insulator provided between the deforming plate and either the positive electrode current collector or the negative electrode current collector, and supported toward the sealing body, either the positive electrode current collector or the negative electrode current collector including: a base facing the first insulator; and a lead extending from an end of the base and connecting to the electrode body, the first insulator including a fastener fastening the base and the first insulator together, the fastener including at least a first fastener, a second fastener, a third fastener, and a fourth fastener, between the first fastener and the second fastener, the base of either the positive electrode current collector or the negative electrode current collector being electrically connected to the deforming plate, the second fastener being located closer to the lead than the first fastener, the second fastener being located closer to an electrical connection between the base and the deforming plate than a position of the first insulator supported toward the sealing body, and in a longitudinal direction of the sealing body, at least a portion of the third fastener and at least a portion of the fourth fastener being provided (i) closer to the lead than an end, of the electrical connection between the base and the deforming plate, toward the lead, and (ii) to an outer periphery of the base.

The base may be provided with the only one lead.

The first insulator may be made of resin having a Young's modules of 1,500 Mpa or below.

The first insulator may include a rib provided on a face of the first insulator toward the electrode body, the rib protruding toward the electrode body and extending along the outer periphery of the base.

On the first insulator, the rib may sandwich the lead and extends along the outer periphery of the base.

The electrode body may weigh 100 g or over, and the first insulator may have an area located between the deforming plate and the base and having a thickness of 1.0 mm or less.

The second fastener may be provided between the third fastener and the fourth fastener.

The fastener may be a protrusion provided to the first insulator, and the first insulator and either the positive electrode current collector or the negative electrode current collector may be fastened together when the protrusion engages with an opening or a cut-out provided to the base of either the positive electrode current collector or the negative electrode current collector.

A second insulator may be provided between the sealing body and the tube of the electrical conductor. The first insulator and the second insulator may be connected to each other.

The first insulator and the electrical conductor may be connected to each other.

The secondary battery of the present disclosure has four fasteners, arranged in predetermined positions of the first insulator, to fasten the first insulator and either the positive electrode current collector or the negative electrode current collector together, contributing to reducing the risk of the current interrupt mechanism malfunctioning

DETAILED DESCRIPTION

Figure 1:
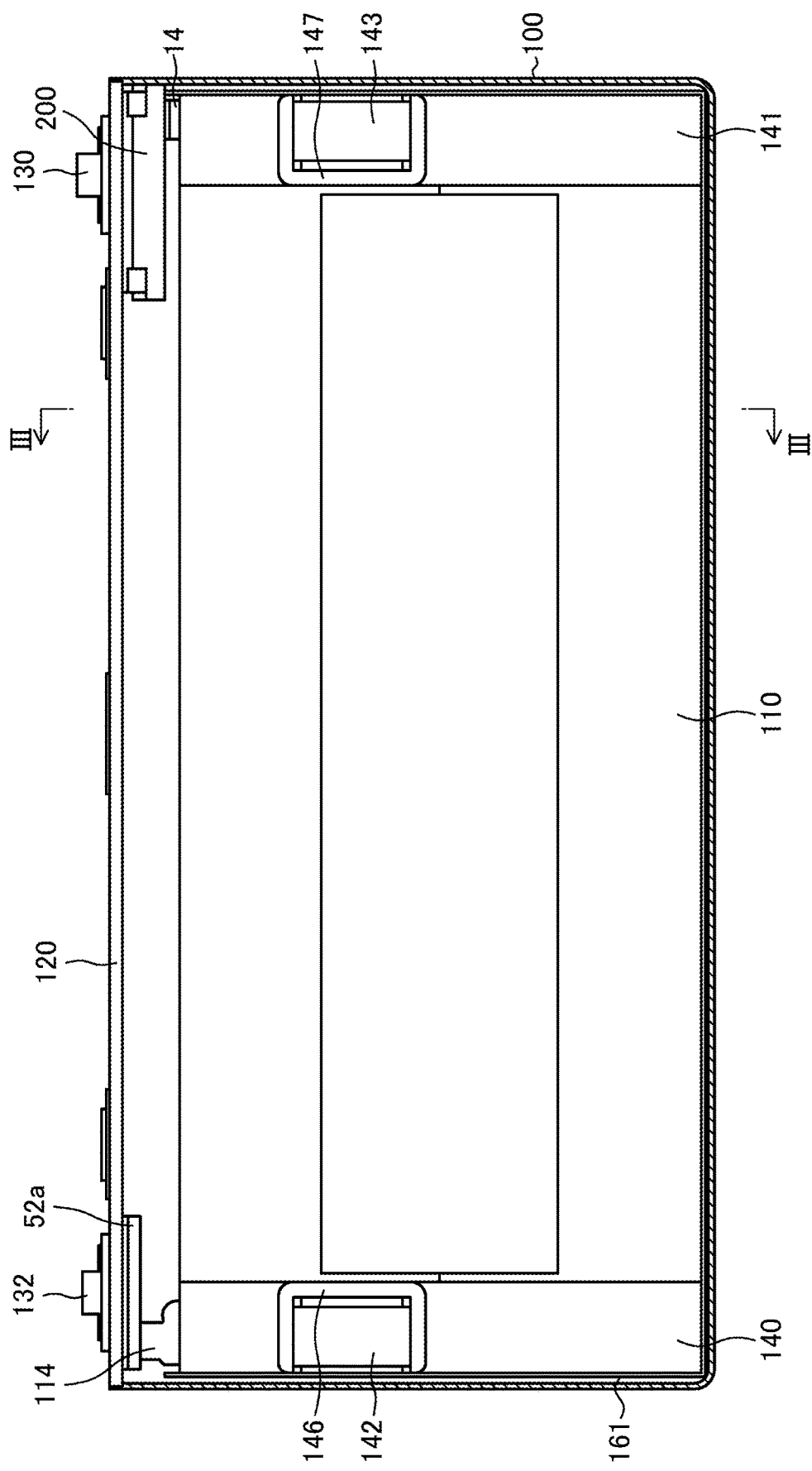
FIG. 1 is a schematic front view illustrating the inside of a battery according to an embodiment without a battery case front face and an insulating sheet front face.
Figure 2:
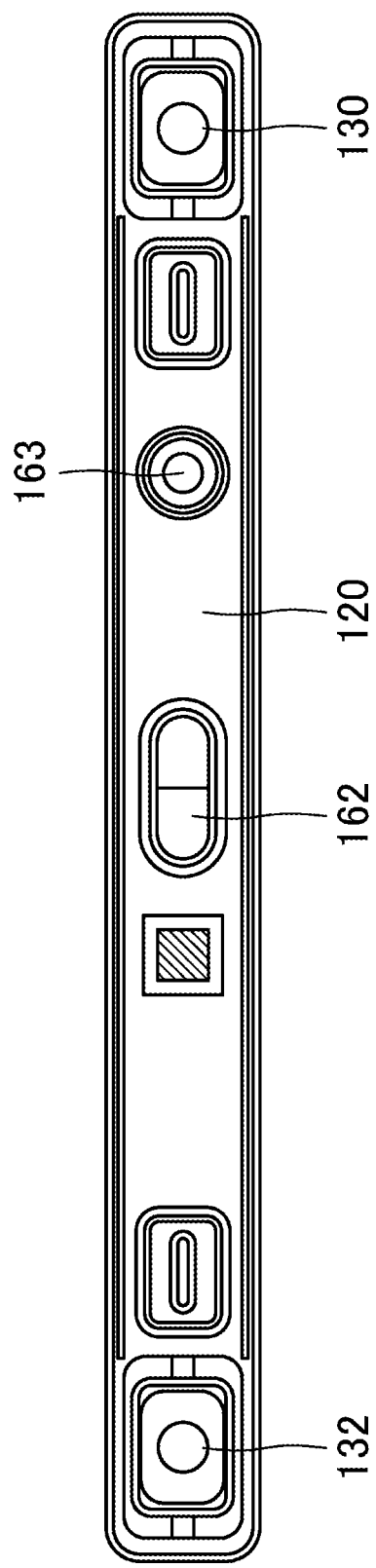
FIG. 2 is a schematic top view of the battery according to the embodiment.
Figure 3:
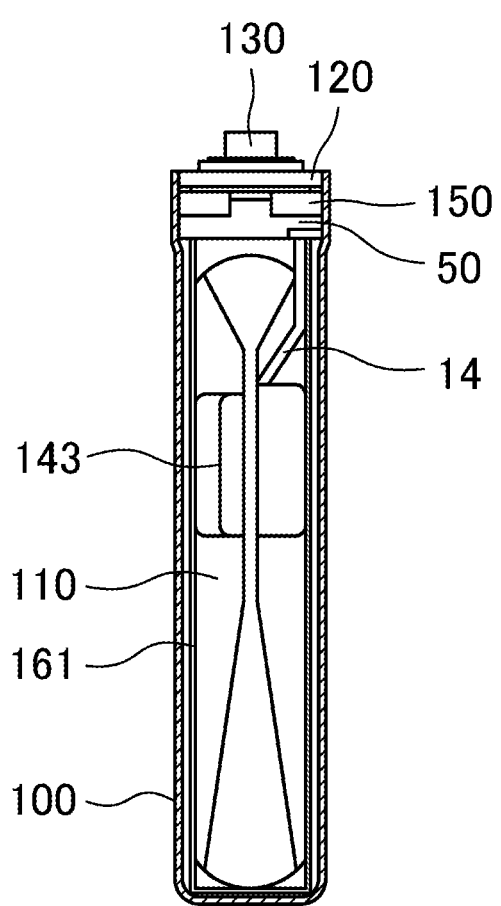
FIG. 3 is a schematic side view illustrating the inside of the battery toward a positive electrode according to the embodiment without a battery case side face (toward the positive electrode) and an insulating sheet side face (toward the positive electrode).
Figure 4:
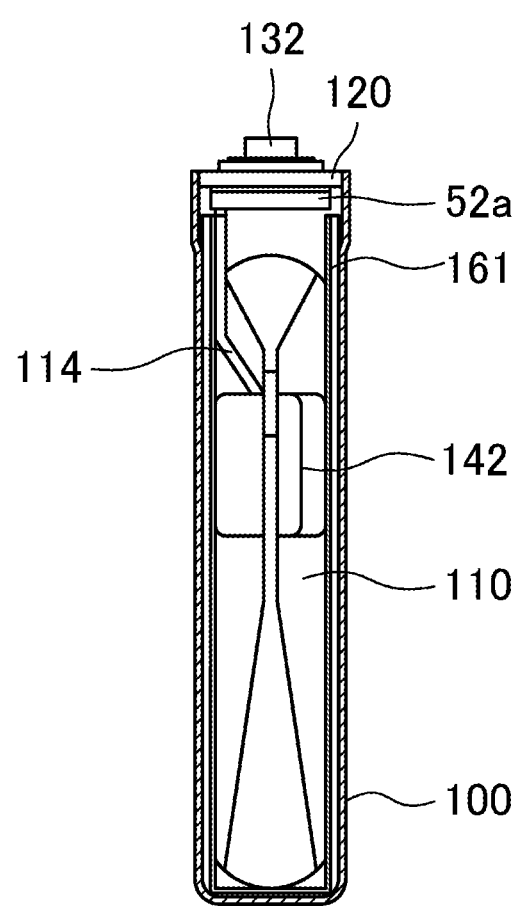
FIG. 4 is a schematic side view illustrating the inside of the battery toward a negative electrode according to the embodiment without a battery case side face (toward the negative electrode) and an insulating sheet side face (toward the negative electrode).

Embodiments of the present disclosure will now be described in detail with reference to the drawings. The following description of advantageous embodiments is only examples in nature, and is not intended to limit the scope, applications or use of the present disclosure. In the drawings below, constituent features substantially sharing the same function are denoted with the same reference sign for the sake of simplicity.

First Embodiment

Described first is a secondary battery according to the first embodiment with reference to FIGS. 1 to 4. The secondary battery in this embodiment is a square secondary battery including an electrode body 110 into which a positive electrode plate (not shown) and a negative electrode plate (not shown) are rolled with a separator (not shown) sandwiched therebetween. The electrode body 110 is shaped into a flat plate. The electrode body 110 weighs 100 g or over. The positive electrode plate acting as a positive electrode is prepared as follows: A sheet of aluminum foil to work as a positive electrode core is coated in both faces with a positive electrode active material compound; and the aluminum foil sheet is dried and extended with pressure, and then slit so that one end of the positive electrode plate has exposed aluminum foil remaining in the longitudinal direction of the end. Moreover, the negative electrode plate acting as a negative electrode is prepared as follows: A sheet of copper foil to work as a negative electrode core is coated in both faces with a negative electrode active material compound, and the copper foil sheet is dried and extended with pressure, and then slit so that one end of the negative electrode plate has exposed copper foil remaining in the longitudinal direction of the end.

Then, the obtained positive electrode plate and negative electrode plate are layered and rolled together, and shaped into a flat plate to become the electrode body 110. When layered together, the positive electrode plate and the negative electrode plate are shifted from each other so that the exposed portion of the positive electrode core of the positive electrode plate and the exposed portion of the negative electrode core of the negative electrode plate have areas which do not overlap the respective opposing electrodes. When the positive electrode plate and the negative electrode plate are layered together, a microporous separator made of polypropylene and polyethylene is sandwiched between the positive electrode plate and the negative electrode plate. Along the rolling axis, the electrode body 110 has one end provided with a positive electrode core exposing portion 141 and another end provided with a negative electrode core exposing potion 140.

The positive electrode core exposing portion 141 is electrically connected to a positive electrode terminal 130 via a positive electrode current collector. A lead 14 of the positive electrode current collector is welded and connected to one of the outer faces of the positive electrode core exposing portion 141. A receiver 143 is welded and connected to another one of the outer faces of the positive electrode core exposing portion 141. An insulation film sheet having an opening is formed between the one outer face of the positive electrode core exposing portion 141 and the lead 14 of the positive electrode current collector. Through the opening of the insulation film sheet, the positive electrode core exposing portion 141 and the lead 14 of the positive electrode current collector are welded and connected together. An insulation film sheet 147 having an opening is formed between the other outer face of the positive electrode core exposing portion 141 and the receiver 143 of the positive electrode current collector. Through the opening of the insulation film sheet 147, the positive electrode core exposing portion 141 and the receiver 143 of the positive electrode current collector are welded and connected together.

Moreover, the positive electrode current collector is electrically insulated from a sealing plate (a sealing body) 120 by a first insulator 50 and a second insulator 150.

The negative electrode core exposing potion 140 is electrically connected to a negative electrode terminal 132 via a negative electrode current collector. A lead 114 of the negative electrode current collector is welded and connected to one of the outer faces of the negative electrode core exposing potion 140. A receiver 142 of the negative electrode current collector is welded and connected to another one of the outer faces of the negative electrode core exposing potion 140. An insulation film sheet having an opening is formed between the one outer face of the negative electrode core exposing potion 140 and the lead 114 of the negative electrode current collector. Through the opening of the insulation film sheet, the negative electrode core exposing potion 140 and the lead 114 of the negative electrode current collector are welded and connected together. An insulation film sheet 146 having an opening is formed between the other outer face of the negative electrode core exposing potion 140 and the receiver 142 of the negative electrode current collector. Through the opening of the insulation film sheet 146, the negative electrode core exposing potion 140 and the receiver 142 of the negative electrode current collector are welded and connected together. Moreover, the negative electrode current collector is electrically insulated from the sealing plate 120 by a negative electrode insulator 52a.

Each of the positive electrode terminal 130 and the negative electrode terminal 132 is secured to the sealing plate 120 via an insulator. The secondary battery of this embodiment is provided with a current interrupt mechanism 200 between the positive electrode and the positive electrode terminal 130. The current interrupt mechanism 200 is pressure-sensitive.

The electrode body 110 is housed in a battery case 100 while the periphery of the electrode body 110 except a side to the sealing plate 120 is covered with an insulation sheet 161. The battery case 100 has a bottom and is shaped into a square tube. The battery case 100 has an opening sealed by the sealing plate 120 shaped into a rectangle. The sealing plate 120 is provided with an electrolyte injection hole 163. After injection of electrolyte, the electrolyte injection hole 163 is sealed by a plug. Moreover, the sealing plate 120 is provided with a gas exhaust valve 162 which opens upon reception of a gas pressure higher than a working pressure of the current interrupt mechanism 200.

Described next is the current interrupt mechanism 200. This current interrupt mechanism 200 may be provided either toward the positive electrode or the negative electrode. Hereinafter, the current interrupt mechanism 200 is to be provided only toward the positive electrode. Note that the current interrupt mechanism 200 functions in a manner that an increase in the pressure inside the battery case 100 deforms a member in the vicinity of a vulnerable part provided to a portion of a current path, such that the deformation of the member breaks the vulnerable part to interrupt a running current.

Figure 5:
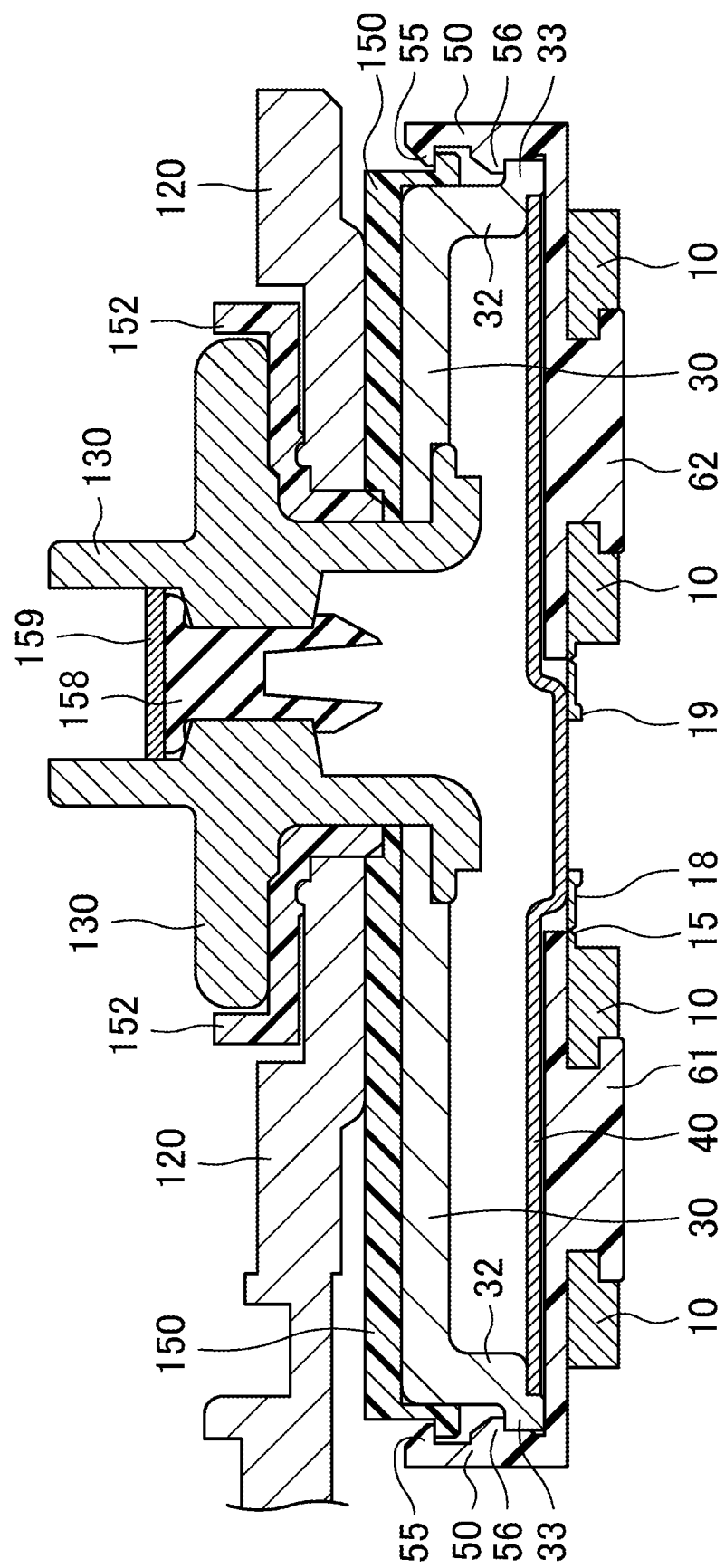
FIG. 5 is an enlarged cross-sectional schematic view in the vicinity of a positive electrode terminal of the battery according to the embodiment, the cross-sectional view being drawn in parallel with a front face, and along a center line of a top face, of the battery.
Figure 6:
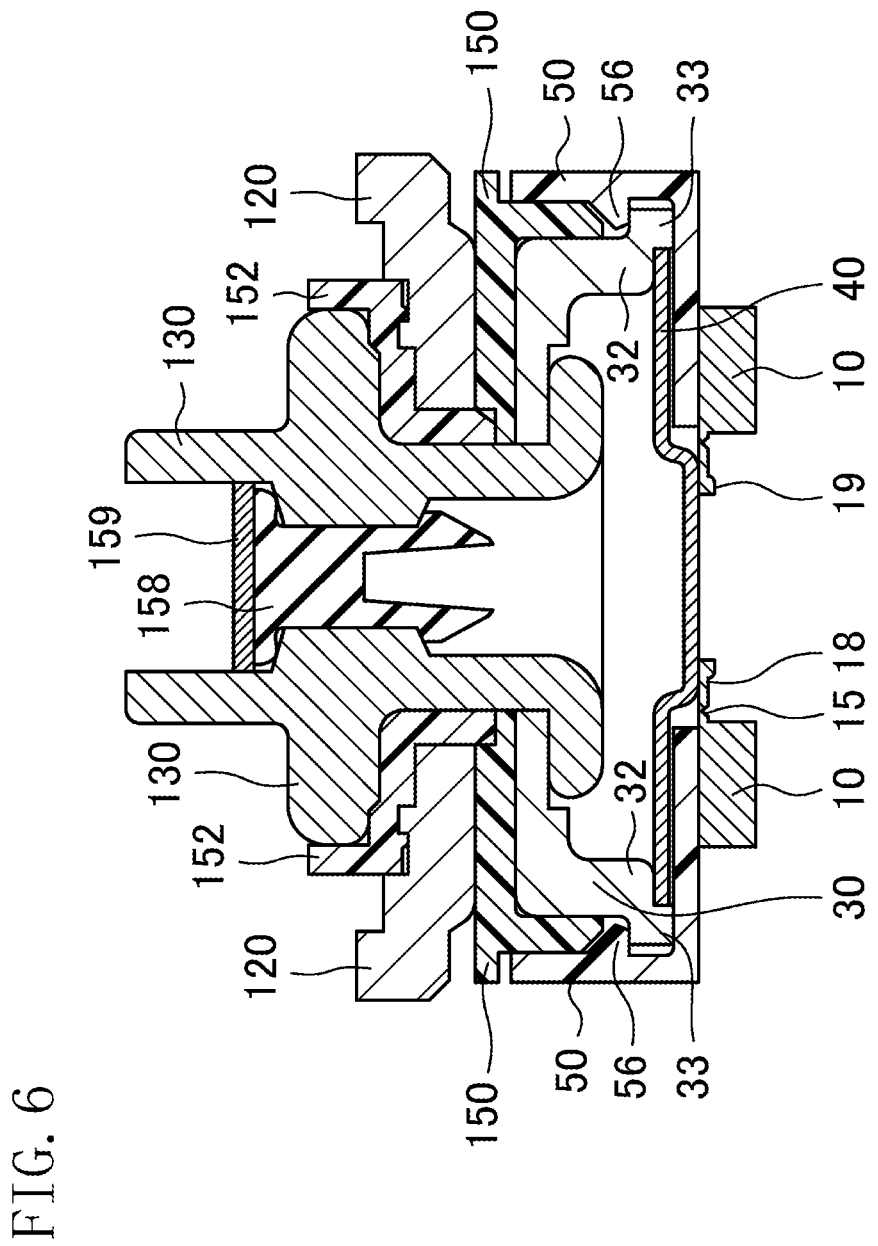
FIG. 6 is an enlarged cross-sectional view in the vicinity of the positive electrode terminal of the battery according to the embodiment, the cross-sectional view being drawn in parallel with a side face, and along a center line of the positive electrode terminal, of the battery.

As illustrated in FIGS. 5 and 6, the positive electrode terminal 130 has a through hole formed therein. The positive electrode terminal 130 is inserted into a through hole formed on each of a terminal insulator 152, the sealing plate 120, the second insulator 150, and an electrical conductor 30. A tip end of the positive electrode terminal 130 toward the inside of the battery is pressed against, and swaged around, the electrical conductor 30, so that the positive electrode terminal 130 and the electrical conductor 30 are integrally secured to each other. Hence, the positive electrode terminal 130 is electrically insulated from the sealing plate 120 by the terminal insulator 152 and the second insulator 150, and electrically connected to the electrical conductor 30. Although not shown in FIGS. 5 and 6, an electrode body is provided across from all the illustrated constituent features on the opposite side of the sealing plate 120 with respect to the second insulator 150. Note that the tip end of the positive electrode terminal 130 toward the inside of the battery and the connection of the electrical conductor 30 are preferably welded and connected together by, for example, laser welding. Moreover, the through hole formed in the positive electrode terminal 130 is sealed by a terminal plug 158 made of rubber and having a top end provided with a metal plate 159.

Provided between the sealing plate 120 and the electrical conductor 30, the second insulator 150 insulates the sealing plate 120 and the electrical conductor 30 from each other. The electrical conductor 30 includes: a tube 32 provided toward the electrode body 110 and having a substantially rectangular cross-section; and a connection provided toward, and in parallel with, the sealing plate 120. The positive electrode terminal 130 is inserted into the through hole formed in the electrical conductor 30. Note that the cross-section, of the tube 32, in parallel with the sealing plate 120 may have any given shape. The cross-section may be shaped into a circle, as well as a rectangle.

The tube 32 of the electrical conductor 30 has an opening toward the electrode body. The opening is sealed by a deforming plate 40. A tip end of the tube 32 of the electrical conductor 30 and the circumference of the deforming plate 40 are welded together. The deforming plate 40 is made of such a conductive material as aluminum, and acts as a valve to be deformed toward the sealing plate 120 (toward the outside of the battery) when the pressure inside the battery case 100 increases to reach a predetermined pressure. The positive electrode current collector 10 is connected to a face, of the deforming plate 40, toward the electrode body. As can be seen, the current path is formed of the positive electrode current collector 10, the deforming plate 40, the electrical conductor 30, and the positive electrode terminal 130 in the stated order from the positive electrode of the electrode body.

The first insulator 50 is provided between the positive electrode current collector 10 and the deforming plate 40 except the center of the deforming plate 40. The first insulator 50 is provided with a through hole on a portion corresponding to the center, of the deforming plate 40, in which the deforming plate 40 and the positive electrode current collector 10 are connected together.

The first insulator 50 is supported toward the sealing plate 120. Specifically, the first insulator 50 engages with, and is connected to, the second insulator 150 to be supported toward the sealing plate 120. Moreover, the first insulator 50 engages with, and is connected to, the electrical conductor 30 to be supported toward the sealing plate 120.

The first insulator 50 has a hook 55 latched on, and fastened to, the second insulator 150. Furthermore, the first insulator 50 has a hook 56 connected to a flange 33 of the electrical conductor 30. Note that the hooks 55 and 56 are formed on the outer periphery of the first insulator 50.

Figure 7:
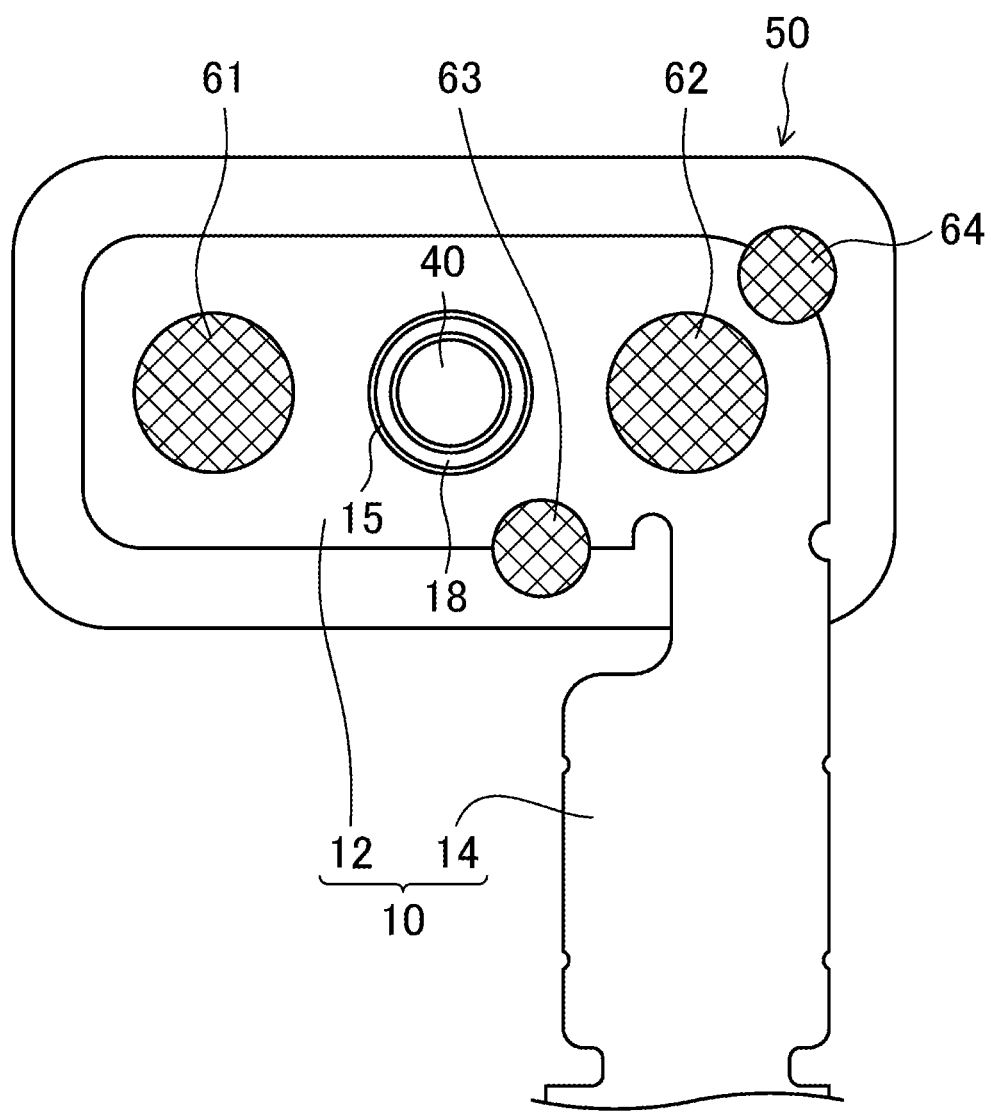
FIG. 7 is a schematic view of a pre-folded positive electrode current collector and a first insulating member included in a current interrupt mechanism according to the embodiment, the positive electrode current collector and the first insulator being observed from an electrode body.

As illustrated in FIG. 7, the positive electrode current collector 10 includes: a base 12 facing the first insulator 50 and provided in parallel with the sealing plate 120; and a lead 14 folded at this base 12 and electrically connected to the positive electrode core exposing portion 141. The base 12 is shaped in a substantially rectangle, and the lead 14 extends from one of the long sides of the base 12. The base 12 is provided with only one lead 14. Note that the lead 14 in FIG. 7 is not yet folded along one of the long sides of the base 12. This positive electrode current collector 10 is a punched-out aluminum plate.

In the center, the base 12 of the positive electrode current collector 10 has a through hole. As illustrated in FIGS. 5 and 7, the base 12 has two through holes each formed on either side of the base 12 so that the two through holes face each other across the through hole in the center. Moreover, two semicircular cut-outs are formed on the outer periphery of the base 12. One of the two cut-outs is formed on a long side, of the base 12, provided with the lead 14. The other one of the cut-outs is formed on a corner of the base 12. The corner is between a short side of the base 12 close to the lead 14 and the other long side not provided with the lead 14.

In the longitudinal direction of the sealing plate 120, a portion of the one cut-out and the whole of the other cut-out are located closer to the lead 14 than an end, of the through hole in the center of the base 12, toward the lead 14.

The first insulator 50 is provided with: a through hole facing the through hole formed in the center of the base 12 of the positive electrode current collector 10; protrusions each corresponding to one of the two through holes formed on the base 12 of the positive electrode current collector 10 and facing each other; and protrusions each corresponding to one of the semicircular cut-outs.

Each of these protrusions of the first insulator 50 is inserted into a corresponding one of the through holes formed on the positive electrode current collector 10 and facing each other, and the cut-outs. Tip ends of the inserted protrusions are heated and a diameter of the tip ends increases, such that the first insulator 50 and the base 12 of the positive electrode current collector 10 are fastened together. The protrusions the tip ends of which are increased act as: a first fastener 61 and a second fastener 62 each inserted in one of the two through holes facing each other; and as a third fastener 63 and a fourth fastener 64 each inserted in one of the cut-outs.

As illustrated in FIG. 7, between the first fastener 61 and the second fastener 62, the base 12 of the positive electrode current collector 10 is electrically connected to the deforming plate 40. Moreover, in the longitudinal direction of the sealing plate 120, a portion of the third fastener 63 and the whole of the fourth fastener 64 are located closer to the lead 14 than an end, of the electrical connection between the base 12 and the deforming plate 40, toward the lead 14.

Even if an impact is applied to the battery when the battery vibrates or falls, for example, and the electrode body 110 moves to pull the lead 14 of the positive electrode current collector 10, a stress to be applied to the connection between the positive electrode current collector 10 and the deforming plate 40 is effectively reduced on both ends of the connection.

A thin area 18 is provided to a circumference of the through hole in the center of the base 12 of the positive electrode current collector 10. The thin area 18 is thinner than other portions of the base 12. In the vicinity of the outer circumference of the thin area 18, a notch 15 shaped in a circle is formed to surround the through hole. This notch 15 is shaped into a groove to be thinner than the thin area 18. Preferably, the notch 15 has a V-shaped cross-section. Moreover, the inner circumference of the thin area 18 is provided with an inner circumference rib 19. On the inner circumference rib 19, the deforming plate 40 and the positive electrode current collector 10 are laser-welded together on multiple points and electrically connected.

Described below is how the current interrupt mechanism 200 according to this embodiment works. When the internal pressure of the battery case 100 increases to be a predetermined pressure, the deforming plate 40 is deformed toward the sealing plate (the outside of the battery case). The deformation breaks the entire circumference of the notch 15, such that the deforming plate 40 and the positive electrode current collector 10 are electrically disconnected from each other and the current is interrupted.

The first insulator 50 may be relatively soft, and made of a material having a low Young's modulus ranging from, for example, 200 MPa to 1,500 MPa. Preferably, the first insulator 50 is made of such materials as perfluoroalkoxy alkane (PFA), polytetrafluoroethylene (PTFE), and ethylene-tetrafluoroethylene copolymer (ETFE) each having a Young's modulus ranging from 300 Mpa to 600 MPa. Among these materials, PFA is more appropriate than others. The Young's moduli are measured in accordance with the ASTM D638. The first insulator 50 is relatively soft and thus easily inserted in the second insulator 150. Hence, the first insulator 50 is easily latched on, and fastened to, the second insulator 150.

The first insulator 50 receives the weight of the electrode body 110 through the positive electrode current collector 10. For example, the second fastener 62 is located closer to the connection between the deforming plate 40 and the positive electrode current collector 10 than a position of the first insulator 50 supported toward the sealing plate 120 (i.e., the hooks 55 and 56 formed on the end of the first insulator 50 toward the lead 14 in the longitudinal direction of the sealing plate 120). Hence, a moment created by the weight of the electrode body 110 acts on the first insulator 50 toward the electrode body 110, with a position of the first insulator 50 supported toward the sealing plate 120 working as a fulcrum. The moment could cause the first insulator 50 to be deformed to bend toward the electrode body 110. In particular, the bend is remarkable when the first insulator 50 is made of soft resin. If the first insulator 50 is deformed, such vulnerable parts as the thin area 18 and the notch 15 provided to the positive electrode current collector 10 change in shape and the connection between the deforming plate 40 and the positive electrode current collector 10 bends. Because of the change in shape and the bend, the current interrupt mechanism 200 could malfunction even if the internal pressure of the battery case 100 reaches a predetermined pressure. For example, when the deforming plate 40 is deformed, a portion of the notch 15 is left unbroken and the current would be uninterrupted. Alternatively, the current interrupt mechanism 200 could be activated at a pressure other than the predetermined pressure; that is, the current interrupt mechanism 200 is activated before the pressure reaches, or after the pressure exceeds, the predetermined pressure.

In this embodiment, the first fastener 61 and the second fastener 62 are respectively formed on one side and the other side of the electrical connection between the base 12 and the deforming plate 40. Moreover, the third fastener 63 and the fourth fastener 64 are formed on predetermined positions on the electrical connection. Hence, the second fastener 62, the third fastener 63, and the fourth fastener 64, protruding toward the electrode body and thus thicker than other portions, are formed relatively close to the lead 14. Such a feature can improve a mechanical strength of a portion, of the first insulator 50, close to the lead 14 and distribute load, contributing to reduction of a bend on the first insulator 50. Thus, the working pressure of the current interrupt mechanism 200 can be kept from significantly changing from the predetermined pressure, making the square secondary battery reliable.

Note that, when the lead 14 is provided on the outer periphery of the base 12 between the third fastener 63 and the fourth fastener 64, the bend on the first insulator 50 can be effectively reduced.

Moreover, in the longitudinal direction of the sealing plate 120, at least a portion of the third fastener 63 is preferably located closer to the lead 14 than an end, of the electrical connection between the base 12 and the deforming plate 40, toward the lead 14, and the whole of the fourth fastener 64 is preferably located closer to the lead 14 than the end, of the electrical connection between the base 12 and the deforming plate 40, toward the lead 14.

Preferably, the second fastener 62 is provided between the third fastener 63 and the fourth fastener 64. Such an arrangement makes it possible for the second fastener 62, the third fastener 63, and the fourth fastener 64 to reliably support the first insulator 50 without deformation even if the first insulator 50 receives the weight of the electrode body 110 through the lead 14. Note that, as illustrated in FIG. 7, it is more effective if the second fastener 62, the third fastener 63, and the fourth fastener 64 are arranged in a substantially straight line.

In particular, when the electrode body 110 becomes larger and heavier because a secondary battery becomes higher in capacity, providing the first fastener 61, the second fastener 62, the third fastener 63, and the fourth fastener 64 is significantly effective in increasing mechanical strength of the first insulator 50. When the electrode body 110 weighs 100 g or over and a portion of the first insulator 50 except the first fastener 61, the second fastener 62, the third fastener 63, and the fourth fastener 64; that is a portion sandwiched between the deforming plate 40 and the positive electrode current collector 10 has a thickness of 1.0 mm or less, providing the first fastener 61, the second fastener 62, the third fastener 63, and the fourth fastener 64 is particularly effective.

Note that, this embodiment describes an example in that the first insulator 50 is connected to the electrical conductor 30, as well as to the second insulator 150, as a technique for supporting the first insulator 50 toward the sealing plate 120. However, any given technique is utilized to support the first insulator 50 toward the sealing plate 120. The first insulator 50 may be connected either to the second insulator 150 alone or to the electrical conductor 30 alone. Furthermore, the first insulator 50 may be connected to the sealing plate 120.

Note that, more preferably, the first insulator 50 is connected to the electrical conductor 30, as well as to the second insulator 150. Hence, the first insulator 50 is supported more rigidly toward the sealing plate 120. Furthermore, as illustrated in FIG. 5, the connection between the first insulator 50 and the second insulator 150 and the connection between the first insulator 50 and the electrical conductor 30 are arranged preferably in a straight line perpendicular to the sealing plate 120. Specifically, the connection between the first insulator 50 and the second insulator 150 is preferably provided directly above the connection between the first insulator 50 and the electrical conductor 30.

This embodiment describes an example of the positive electrode terminal 130 and the electrical conductor 30 each formed into an individual part. However, the positive electrode terminal 130 and the electrical conductor 30 may be formed into a single part.

As illustrated in FIG. 5, in the longitudinal direction of the sealing plate 120 shaped into a rectangle, the through hole receiving the positive electrode terminal 130 provided to the electrical conductor 30 is preferably provided close to the lead 14 of the positive electrode current collector 10 instead of the center of the electrical conductor 30. Such a structure makes it possible to decrease the distance between (i) a portion, of the positive electrode terminal 130, in which the sealing plate 120, the second insulator 150 and the current collector 30 are fastened together and (ii) a portion, of the positive electrode current collector 10 and the first insulator 50, which is likely to receive the weight of the electrode body. This is more preferable since the risk of bends on the parts can be reduced more reliably.

Second Embodiment

Figure 8:
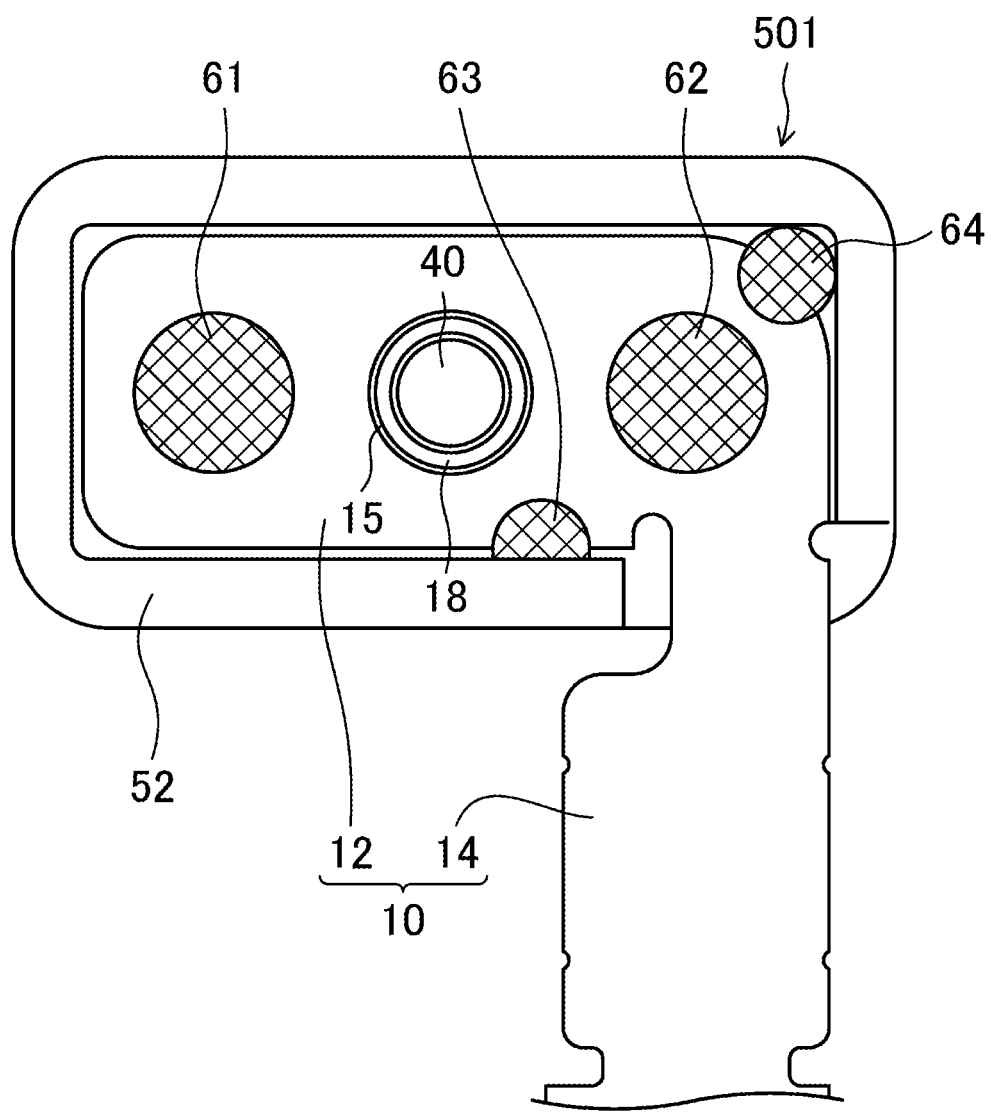
FIG. 8 is a schematic view of a pre-folded positive electrode current collector and a first insulating member included in a current interrupt mechanism according to another embodiment, the positive electrode current collector and the first insulator being observed from an electrode body.
Figure 9:
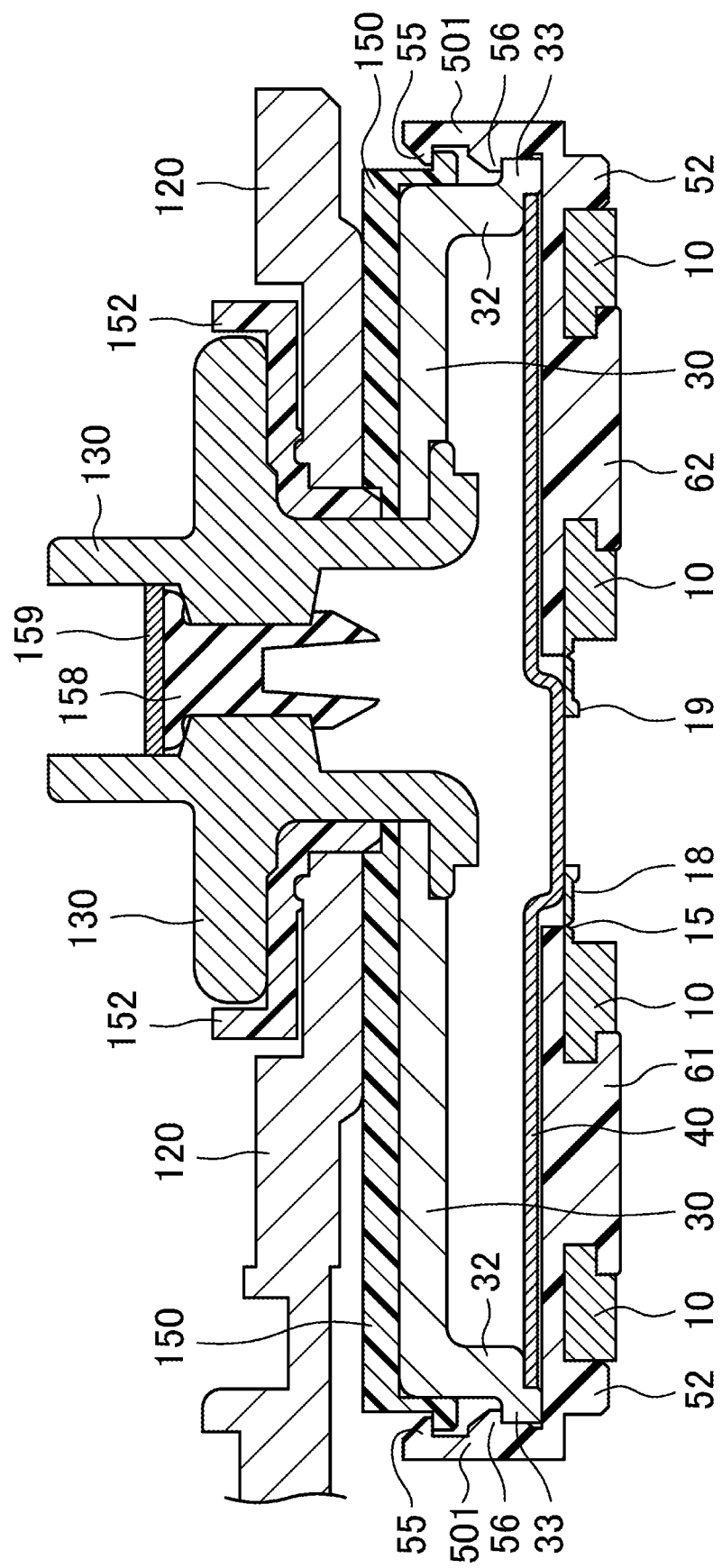
FIG. 9 is an enlarged schematic cross-sectional view in the vicinity of a positive electrode terminal of a battery according to still another embodiment, the cross-sectional view being drawn in parallel with a front face, and along a center line of a top face, of the battery.

As illustrated in FIGS. 8 and 9, a first insulator 501 in a second embodiment is different in shape from the first insulator 50 in the first embodiment. Other than that, the second embodiment is the same as the first embodiment, and only the difference between the second embodiment and the first embodiment will be described below.

The first insulator 501 in this embodiment is slightly larger than the base 12 of the positive electrode current collector 10 and shaped into a substantial rectangle (a rectangle whose corners are rounded off or cut) in a planar view. The first insulator 501 includes a rib 52 formed to surround the outer periphery of the base 12. Note that, as illustrated in FIG. 7, the rib 52 is not formed on a portion in which the lead 14 extends. The rib 52 is formed thicker than portions of the first insulator 50 (except the first fastener 61, the second fastener 62, the third fastener 63, and the fourth fastener 64) other than the rib 52.

In order to reduce the risk that the above current interrupt mechanism 200 malfunctions, the first insulator 501 in this embodiment is provided with the rib 52, in addition to the first fastener 61, the second fastener 62, the third fastener 63, and the fourth fastener 64, so that the rib 52 enhances the mechanical strength of the first insulator 501. Specifically, the rib 52, which is thicker than the center of the first insulator 501 (i.e., protruding toward the electrode body), is provided to the outer periphery of the first insulator 501 shaped into a substantially rectangle and a flat plate in a planar view. Such a feature more effectively reduces the risk that the first insulator 501 is deformed when the weight of the electrode body 110 pulls vertically downward a portion, of the first insulator 501, to which the positive electrode current collector 10 is fastened.

Preferably, the longer the rib 52 is formed along the outer periphery of the first insulator 501, the further the strength of the first insulator 501 improves. Note that, in this embodiment, the lead 14 of the positive electrode current collector 10 secured to the first insulator 501 is formed to extend over an area facing the first insulator 501. Hence, the rib 52 is not formed in a part in which the lead 14 crosses the outer periphery of the first insulator 501. Hence, the rib 52 sandwiches the read 14 and extends along the outer periphery of the first insulator 501. The rib 52 is formed along the whole outer periphery of the first insulator 501 except a portion on which the lead 41 is provided. Note that the lead 14 is folded substantially perpendicularly to the first insulator 501 after the positive electrode current collector 10 is secured to the first insulator 501. After folded, the lead 14 might not face a portion, of the first insulator 501, in which the rib 52 is not found.

Note that the rib 52 can be provided to the whole outer periphery of the first insulator 501. In this case, the positive electrode current collector 10 to be used has the lead 14 folded with respect to the base 12.

The length of the rib 52 along the outer periphery of the first insulator 501 is preferably 30% or greater of the length of the outer periphery of the first insulator 501, more preferably 50% or greater, and still more preferably 70% or greater.

The first insulator 501 is likely to be deformed in the vicinity of the border between the base 12 and the lead 14 of the positive electrode current collector 10. Hence, preferably, the rib 52 is shaped lineally in a planar view and provided to each of a long side (a side extending in the longitudinal direction of the sealing plate 120) and a short side (a side extending in the transverse direction of the sealing plate 120), of the outer periphery of the first insulator 501, adjacent to the boundary between the base 12 and the lead 14 of the positive electrode current collector 10.

Moreover, of the outer periphery of the first insulator 501, a width (a width in parallel with the sealing plate 120 and perpendicular to the long side) of the rib 52 formed along the long side is preferably greater than a width (a width in parallel with the sealing plate 120 and perpendicular to the short side) of the rib 52 formed along the short side.

Other Embodiments

The above embodiments are examples of the present disclosure. The present disclosure is not limited to these examples. Instead, the present disclosure may be a combination of a well-known art, a conventional technique, and a publicly-known technique with these examples, and may also have a part of the examples replaced. Moreover, the present disclosure includes modifications at which those skilled in the art easily arrive.

The secondary battery of the present disclosure can be applied not only to a nonaqueous electrolyte secondary battery, but also to an alkaline secondary battery such as a nickel-hydrogen secondary battery. Furthermore, the deforming plate achieves predetermined effects when connected to either one of a positive electrode current collector or a negative electrode current collector; however, the deforming plate may be connected to both of the collectors.

The battery case is not limited to be cuboid (square); instead, the battery case may be cylindrical with a bottom. Moreover, in the tube of the electrical conductor, the cross-section of the tube is not limited to be rectangular; instead, the cross-section may be circular, oval, and polygonal.

In the current interrupt mechanism, the vulnerable part for interrupting a current may be provided to at least one of the positive electrode current collector or the negative electrode current collector, the deforming plate, or the connection between the current collector and the deforming plate. Alternatively, the current collector and the deforming plate may be connected with a metal foil, and the metal foil may be used as the vulnerable part. For example, the current collector may be provided with an opening, the metal foil may be connected to the current collector such that the opening is blocked with the metal foil, and the metal foil is connected also to the deforming plate. Moreover, the vulnerable part may be a thin part thinner than the periphery of the thin part, a cut-out and a notch, or a welding part (a welding nugget).

What is claimed is:

1. A square secondary battery comprising:
a battery case having an opening;
an electrode body housed in the battery case and including a positive electrode and a negative electrode;
a positive electrode current collector electrically connected to the positive electrode;
a negative electrode current collector electrically connected to the negative electrode;
a sealing body sealing the opening of the battery case;
an external terminal exposed outside from the sealing body;
an electrical conductor located between the sealing body and the electrode body, electrically connected to the external terminal, and having a tube;
a deforming plate sealing an opening of the tube, electrically connected to the electrical conductor and to either the positive electrode current collector or the negative electrode current collector, and deformed when an internal pressure of the battery case reaches a predetermined pressure so that the deforming plate is electrically disconnected from either the positive electrode current collector or the negative electrode current collector; and
a first insulator provided between the deforming plate and either the positive electrode current collector or the negative electrode current collector, and supported toward the sealing body,
either the positive electrode current collector or the negative electrode current collector including: a base facing the first insulator; and a lead extending from an end of the base and connecting to the electrode body,
the first insulator including a fastener fastening the base and the first insulator together,
the fastener including at least a first fastener, a second fastener, a third fastener, and a fourth fastener,
between the first fastener and the second fastener, the base of either the positive electrode current collector or the negative electrode current collector being electrically connected to the deforming plate,
the second fastener being located closer to the lead than the first fastener, the second fastener being located closer to an electrical connection between the base and the deforming plate than a position of the first insulator supported toward the sealing body, and in a longitudinal direction of the sealing body, at least a portion of the third fastener and at least a portion of the fourth fastener being provided (i) closer to the lead than an end, of the electrical connection between the base and the deforming plate, toward the lead, and (ii) to an outer periphery of the base.

2. The square secondary battery of claim 1, wherein the base is provided with the only one lead.

3. The square secondary battery of claim 1, wherein the first insulator is made of resin having a Young's modules of 1,500 Mpa or below.

4. The square secondary battery of claim 1 wherein the first insulator includes a rib provided on a face of the first insulator toward the electrode body, the rib protruding toward the electrode body and extending along the outer periphery of the base.

5. The square secondary battery of claim 4, wherein on the first insulator, the rib sandwiches the lead and extends along the outer periphery of the base.

6. The square secondary battery of claim 1, wherein the electrode body weighs 100 g or over, and the first insulator has an area located between the deforming plate and the base and having a thickness of 1.0 mm or less.

7. The square secondary battery of claim 1, wherein the second fastener is provided between the third fastener and the fourth fastener.

8. The square secondary battery of claim 1, wherein the fastener is a protrusion provided to the first insulator, and the first insulator and either the positive electrode current collector or the negative electrode current collector are fastened together when the protrusion engages with an opening or a cut-out provided to the base of either the positive electrode current collector or the negative electrode current collector.

9. The square secondary battery of claim 1 further comprising a second insulator provided between the sealing body and the tube of the electrical conductor, wherein the first insulator and the second insulator are connected to each other.

10. The square secondary battery of claim 1 wherein the first insulator and the electrical conductor are connected to each other.

* * * * *